US007039477B1

(12) United States Patent
Kamiya et al.

(10) Patent No.: US 7,039,477 B1
(45) Date of Patent: May 2, 2006

(54) DEVICE AND METHOD FOR PROCESSING TONE DATA BY CONTROLLING SAMPLING RATE

(75) Inventors: Ryo Kamiya, Hamamatsu (JP); Satoshi Tominaga, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/362,941

(22) Filed: Jul. 28, 1999

(30) Foreign Application Priority Data

Jul. 31, 1998 (JP) ................................ 10-218187

(51) Int. Cl.
*G06F 17/00* (2006.01)
*G10H 7/00* (2006.01)

(52) U.S. Cl. ............................ 700/94; 84/603; 84/615; 84/618

(58) Field of Classification Search .................. 700/94; 84/600, 601, 602, 603, 604, 605, 606, 607, 84/615, 618, 609, 622, 625, 623, 624, 649, 84/659, 660
See application file for complete search history.

(56) References Cited

U.S. PATENT DOCUMENTS 5,127,306 A * 7/1992 Mitsuhashi et al. ........... 84/665
5,481,065 A * 1/1996 Yamada ........................ 84/615
5,532,424 A * 7/1996 Hideo .......................... 84/607
5,539,145 A * 7/1996 Kuribayashi et al. ......... 84/602

FOREIGN PATENT DOCUMENTS

EP 750290 A2 * 12/1996

* cited by examiner

*Primary Examiner*—Vivian Chin
*Assistant Examiner*—Devona E Faulk
(74) *Attorney, Agent, or Firm*—Morrison & Foerster LLP

(57) ABSTRACT

From a storage device storing waveform sample data sampled at a given sampling rate, the waveform sample data are read out asynchronously with the given sampling rate and temporarily stored in an input buffer. The thus-stored waveform sample data are read out from the input buffer and converted to an inner sampling rate selected from among a plurality of predetermined inner sampling rates. Predetermined arithmetic processing is performed on the waveform sample data converted to the selected inner sampling rate. Then, the waveform sample data having undergone the predetermined arithmetic processing are converted to a predetermined output sampling rate and written into an output buffer. The thus-written waveform sample data are then sequentially read out at an sampling frequency corresponding to the output sampling rate, to thereby generate tone data in accordance with the output sampling frequency.

18 Claims, 4 Drawing Sheets

DEVICE AND METHOD FOR PROCESSING TONE DATA BY CONTROLLING SAMPLING RATE

BACKGROUND OF THE INVENTION

The present invention relates to a tone generator processing device, method and computer system which are suitable for lessening processing loads involved in tone data processing.

In recent years, many personal computers are equipped with a tone generator LSI to carry out various sorts of sound processing. Typical examples of the sound processing carried out by the tone generator LSI include a reproduction process where tone data are generated on the basis of control data and waveform data. In this case, the waveform data are data obtained by sampling, at a predetermined rate, tones performed by musical instruments, and the control data designate tone color, reproduction pitch, tone volume, etc. Generally, the personal computer having the sound processing function comprises a CPU for controlling various operations of an entire tone generating apparatus in accordance with the operating system (OS), the tone generator LSI, a main memory for storing the waveform and control data and other application programs, and a bus for connecting various components of the apparatus to provide for necessary data exchange therebetween.

The tone generator LSI has to obtain data necessary for the processing from the main memory via the bus. However, if the bus is used by the tone generator LSI for a long time, the time when other application can use the bus is reduced significantly, which would result in unsmooth operations in the computer system as a whole. To avoid such inconveniences, the tone generator LSI generates a plurality of tone data per predetermined frame that is set to equal a time required for outputting 256 samples of waveform data at an output sampling frequency (rate of digital-to-analog conversion) of 48 kHz, and to this end, the computer system collectively transmits ("burst-transfers") data, necessary for the processing in each frame, from the main memory to the tone generator LSI on a frame-by-frame basis.

FIG. 5 is a functional block diagram showing principal components in a typical example of the conventional tone generator LSI. Assume that this illustrated example is capable of simultaneously generating a plurality of tone colors, and processing corresponding to these tone colors will each be called a "channel" or "ch".

Waveform data WD input to the tone generator LSI are data sampled at various sampling rates such as 44.1 kHz, 22.05 kHz, 11.025 kHz and 8 kHz. Pitch processing PT performs a pitch conversion process on the waveform data WD to generate pitch-converted waveform data WD' corresponding to the output sampling rate of 48 kHz, during which time sampling rate conversion and pitch shift processes are performed simultaneously. When, for example, the waveform data WD of a given channel, having an 8 kHz sampling rate, are to be reproduced with no pitch shift, about 44 samples of the waveform data WD are transferred to the pitch processing PT, which, in turn, converts the number of the samples to "256" through the pitch conversion process.

Next, filter processing FIL performs a second-order IIR filter process on the waveform data WD', and then subjects the thus-filtered data to amplification processing AMP for tone volume adjustment. After that, mixer processing MIX stores the tone data generated in the above-mentioned manner into an internal buffer.

Through the above-mentioned processing, 256 samples are first generated for channel ch1. Then, 256 samples are generated for next channel ch2 in a similar manner and added to corresponding ones of the 256 samples for channel ch1, to thereby provide 256 accumulated samples. Such operations are performed a predetermined number of times corresponding to the number of the channels, so that 256 accumulated samples for the plurality of channels are ultimately provided. The aforesaid processes are performed repeatedly in each of the frames, and thereby accumulation of the tone data of the plurality of channels and simultaneous generation of a plurality of tones are achieved.

As mentioned, the conventional LSIs are arranged in such a manner that the number of samples per frame is converted to that corresponding to the output sampling rate through the pitch processing PT prior to the internal processing such, as the filter processing FIL and amplification processing AMP, so that the internal processing is then carried out at the output sampling rate.

Generally, the processing loads of the tone generator LSI would increase as the number of samples to be processed per frame period increases. Particularly, with the above-discussed conventional tone generator LSIs, their processing loads tend to be very heavy due to the arrangement that the internal processing is executed after the sampling rate of the waveform data WD is raised up to the uniform output sampling rate.

Further, in the sound processing carried out by computer systems, a so-called "3D (three-dimensional) sound positioning" process is sometimes employed to achieve sound reproduction full of a sense of realism. According to this 3D sound positioning process, a "head-related transfer function" HRTF for converting a waveform of a sound produced from a sound source into another waveform corresponding to a sound transmitted to the right and left ears of a dummy head is measured in advance in association with coordinates of the sound source, and a coefficient of the head-related transfer function HRTF (which will hereinafter called a "HRTF" coefficient) is varied dynamically as the coordinates of the sound source change. For example, the 3D sound positioning process can be suitably applied to game software to allow the location of an effect sound source to be moved from left to right in such an imaginary scene where an airplane flies from left to right. For this reason, there has been an increasing demand that the 3D sound positioning process be implemented by the tone generator LSI. There is another demand that an effect process for imparting a sound effect, such as a reverberation or chorus effect, be implemented by the tone generator LSI.

However, in cases where the 3D sound positioning process and effect process are incorporated in the tone generator LSI, the processing loads of the tone generator LSI would increase even further, and a significant increase in costs is required to meet the demands. Therefore, in the conventional computer systems, the 3D sound positioning process and effect process, which would involve heavy processing loads, are carried out by the CPU.

To reduce the processing loads of the tone generator LSI, it may be proposed that the filter processing FIL, amplification processing AMP, etc. be performed directly on the input waveform data WD and the pitch processing PT is performed last to raise the sampling rate of the waveform data WD up to the output sampling rate. However, in this case, there arises needs to previously make sets of coefficient data, corresponding in number to various sampling rates of the input waveform data WD, ready for use in the filter processing FIL and to also switch between the coefficient data sets in accordance with the input waveform data WD. Further, if new functions, such as the 3D sound positioning process and effect process, are incorporated in the tone generator LSI, then another problem would be encountered that the number of the coefficient data to be made in advance has to be increase even further.

SUMMARY OF THE INVENTION

It is therefore an object of the present invention to provide a tone data processing device, method and computer system which achieve enhanced performance while minimizing processing loads.

To accomplish the above-mentioned object, the present invention provides a tone data processing device which receives, from a storage device storing waveform sample data sampled at a given sampling rate, the waveform sample data asynchronously with the given sampling rate and generates tone data on the basis of the waveform sample data received from the storage device, and which is characterized by comprising: an input buffer for storing the waveform sample data received from the storage device; an output buffer; and a processor connected with the input buffer and the output buffer. The processor executes: a process for reading out the waveform sample data stored in the input buffer and converting the sampling rate of the read-out waveform sample data to an inner sampling rate selected from among a plurality of predetermined inner sampling rates; a process for performing predetermined arithmetic processing on the waveform sample data converted to the selected inner sampling rate; a process for converting the waveform sample data having undergone the predetermined arithmetic processing to a predetermined output sampling rate; and a process for writing, to the output buffer, the waveform sample data converted to the predetermined output sampling rate.

The tone data processing device in accordance with the present invention can be used as a tone generator device, such as by being connected to a computer bus. The storage device storing the waveform data may be connected to the computer bus or to a remote computer via a communication line network such as the Internet. Of course, the tone data processing device may include such a storage device as its own attachment. In any event, the waveform sample data stored in the storage device may be of any sampling rate. The tone data processing device has a plurality of predetermined inner sampling rates so that it can carry out predetermined arithmetic processing using any one of the inner sampling rates. The waveform sample data sampled at a desired sampling rate is converted to one inner sampling rate selected from among the plurality of predetermined inner sampling rates, i.e., is resampled. As known in the art, the conversion of the sampling rate, i.e., resampling, is carried out such that appropriate thinning out of the waveform sample data is effected if the sampling rate is to be raised and appropriate repetition of the waveform sample data is effected if the sampling rate is to be lowered; some form of interpolating process may be executed as necessary. Preferably, in selecting a desired inner sampling rate, a comparison may be made between the sampling rate of the waveform sample data stored in the input buffer and the above-mentioned plurality of predetermined inner sampling rates, so as to select one of the predetermined inner sampling rates which is higher than and closest to the sampling rate of the waveform sample data.

The predetermined arithmetic processing on the waveform sample data having been converted to the inner sampling rate can be executed in accordance with the selected inner sampling rate. In this case, the inner sampling rate can be set to be lower than the output sampling frequency, the loads involved in the execution of the predetermined arithmetic processing can be lessened to a significant degree.

Further, because of the provision of a plurality of the predetermined inner sampling rates, the tone data processing device of the invention is allowed to operate at an optimum inner sampling rate that can effectively prevent noise and the like from being caused in the arithmetic processing, enhance the performance and yet lessen the processing loads even where the waveform sample data stored in the storage device are of a variety of sampling rates, by just selecting one of the predetermined inner sampling rates closest to the sampling rates of the waveform sample data.

According to another aspect of the present invention, there is provided a computer system which comprises: a central processing unit; a storage device storing waveform sample data sampled at a given sampling rate and connected via a bus to the central processing unit; and a tone data processing device connected via a bus to the central processing unit and the storage device. The tone data processing device collectively receives, from the storage device, a given number of the waveform sample data asynchronously with the given sampling rate under control of the central processing unit and generates tone data on the basis of the waveform sample data collectively received from the storage device. The tone data processing device comprises: an input buffer for storing the waveform sample data collectively received from the storage device; an output buffer; and a processor connected with the input buffer and the output buffer and adapted to perform: a first process for reading out the waveform sample data stored in the input buffer and converting the sampling rate of the read-out waveform sample data to an inner sampling rate selected from among a plurality of predetermined inner sampling rates; a second process for performing predetermined arithmetic processing on the waveform sample data converted to the selected inner sampling rate; a third process for converting the waveform sample data having undergone the predetermined arithmetic processing to a predetermined output sampling rate; and a fourth process for writing, into the output buffer, the waveform sample data converted to the predetermined output sampling rate.

The present invention may be implemented not only as a device invention but also as a method invention. Further, the present invention may be practiced as a computer program and as a recording medium storing such a computer program.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
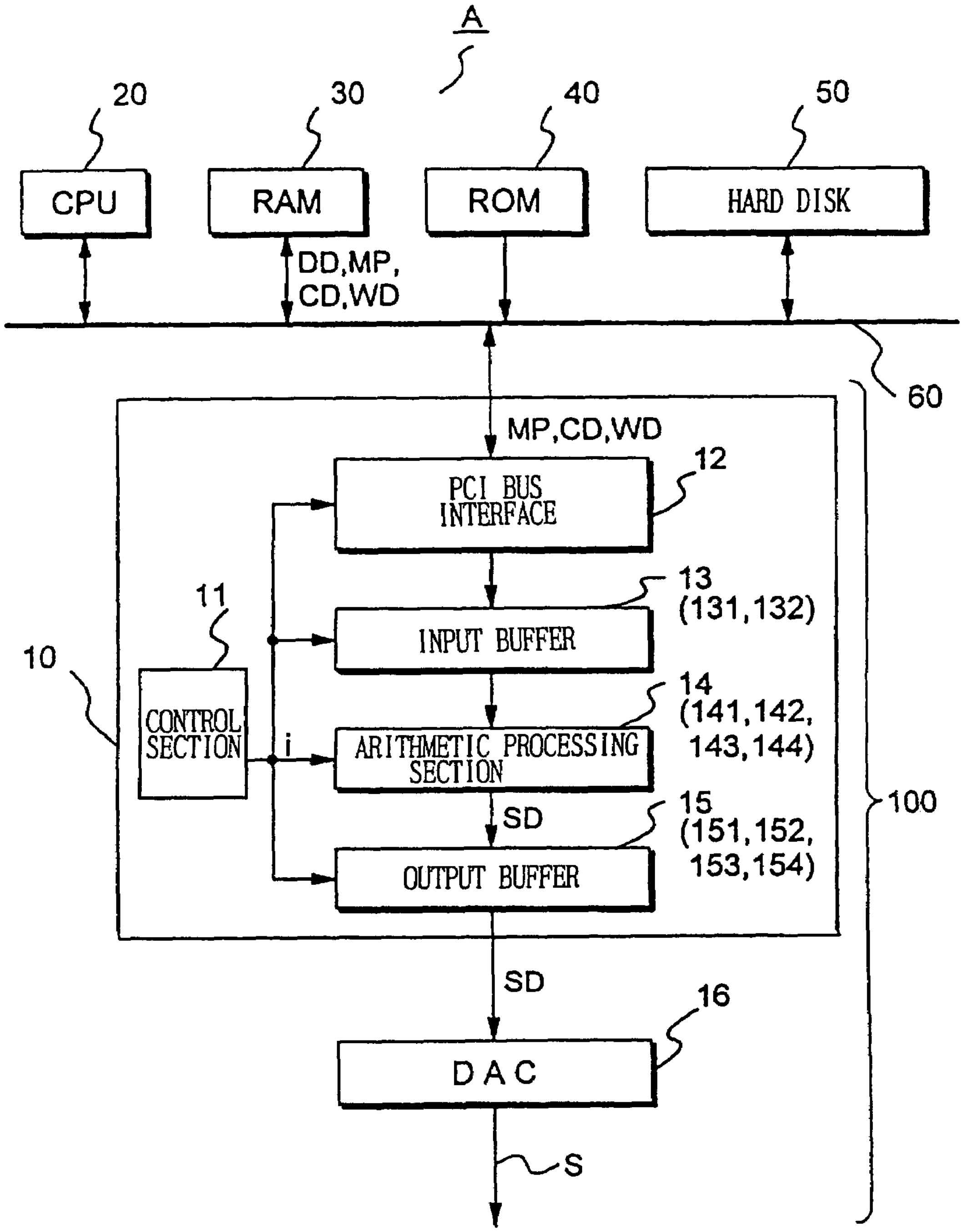
FIG. 1 is a block diagram showing an exemplary hardware organization of a computer system in accordance with a preferred embodiment of the present invention.

1. General Organization of Computer System:

The following paragraphs describe a computer system A in accordance with a preferred embodiment of the present invention, with reference to FIG. 1 which is a block diagram showing an exemplary hardware organization of the computer system A.

In FIG. 1, a CPU 20 is connected with various components of the computer system A via a bus 60, to control various operations in the entire computer system A. RAM 30 is a readable/writable main memory of the computer system A and functions as working areas for the CPU 20. ROM 40 is a read-only memory, where a boot program etc. are prestored. Hard disk device 50 is a secondary storage device of the computer system A, where are prestored application programs, other programs including a device driver DD and microprograms MP, and various data such as control data CD and waveform data WD. These programs and data are loaded into the RAM 30 as necessary.

In the illustrated example, each of the control data CD include tone color information (addresses where a set of the waveform data WD corresponding to a particular tone color is stored), pitch information, tone volume information and sampling rate information indicative of a sampling rate of the corresponding waveform data WD. The waveform data CD are data obtained by sampling tones actually generated by musical instruments, such as guitar and piano, corresponding to various tone colors. Storage area of the RAM 30 for storing various waveform data WD constitutes a well-known wave table.

At start-up of an operating system (OS), the device driver DD, microprograms MP, waveform data WD, etc. are transferred via the bus 60 to the RAM 30, and the control data CD designated by a higher-order application program are transferred to the RAM 30 as necessary. The microprograms MP stored in the RAM 30 are transferred to the tone generator LSI 10. The bus 60 in this illustrated example is a PCI bus (Peripheral Component Interconnect Bus) having a burst transfer mode, although it may be any other type of bus.

Some of the waveform data WD stored in the hard disk device 50 which correspond to tone colors used relatively frequently (i.e., having a relatively high frequency of use) are transferred and stored into the RAM 30, and the waveform data WD are exchanged between the RAM 30 and the hard disk 50 as necessary. Further, in the RAM 30, the waveform data WD are stored in a linear area with consecutive physical addresses. This is because storing the waveform data WD at non-consecutive physical addresses would require calculating the physical addresses from logical addresses and the loads on the OS should be lessened by avoiding the need for the calculation of the physical addresses.

2. Organization of Tone Generator Board:

Tone generator board 100 shown in FIG. 1 is inerrable to an extension slot (not shown), where there are provided the tone generator LSI 10 for generating reproductive tone data SD and a DAC (Digital-to-Analog Converter) 16 for converting each reproductive tone data SD into analog representation to thereby provide a reproduced tone signal S. The process for reproducing the tone data SD is arranged to collectively reproduce a predetermined number of samples (called a frame) at a time. In the illustrated example, a time period required for 256 samples of the reproductive tone data SD at an output sampling rate of 48 kHz is set as one frame (5.3 ms), and the tone generator LSI 10 executes the collective reproduction per subframe that is one fourth of a frame. Further, the tone generator LSI 10 is capable of reproducing a sufficient number of the tone data SD for simultaneously generating a plurality of tones (e.g., 64 channels).

To acquire the tone data SD for reproduction in a given subframe, the tone generator LSI 10 collectively acquires or receives, from the RAM 30 via the PCI bus 60, a necessary number of the waveform data WD that is necessary for reproducing a predetermined number of samples that would correspond to a single subframe when converted to the output sampling rate. Assuming that a plurality of tones of N channels are to be simultaneously generated, waveform data WD1–WDN are received from the RAM 30. The numbers of samples of the individual channels differ depending on the respective sampling rates of the waveform data WD1–WDN. If the sampling rate of the waveform data WD1 is 8 kHz and is to be reproduced with no pitch shift, a total of eight waveform data WD1 will be received because the number of samples per subframe becomes “8”.

The acquisition of the waveform data WD is done via burst transmission in response to designation of the respective start addresses and number of samples of the waveform data WD1–WDN. Namely, predetermined successions of the waveform data WD stored in the RAM 30 are extracted and collectively transferred to and received by the tone generator LSI. On the basis of the received waveform data, the tone generator LSI first generates 64 samples for channel ch1 corresponding to a single subframe and then similarly generates 64 samples for channel ch2 corresponding to the same subframe. Next, the tone generator LSI 10 adds together corresponding ones of the 64 samples for channels ch1 and ch2, to thereby provide 64 accumulated samples for channels 1 and 2. The tone generator LSI 10 carries out these operations for the N channels so as to ultimately obtain 64 accumulated samples for the N channels corresponding to the same subframe. The above-mentioned process for obtaining 64 accumulated samples for the N channels is performed for each of the subframes, and the 64 accumulated samples generated in a given subframe are transferred, in the next frame, to the DAC 16 in accordance with the output sampling rate.

2-1. Tone Generator LSI:

As shown in FIG. 1, the tone generator LSI 10 includes a control section 11, a PCI bus interface 12, an input buffer 13, an arithmetic processing section 14 and an output buffer 15. The control section 11 stores the microprograms MP, transferred from the RAM 30, into its internal memory (not shown) and issues instructions i to control various components of the tone generator LSI 10 in accordance with the microprograms MP. The PCI bus interface 12 has a bus master function, so that the tone generator LSI 10 is allowed to read out the control data CD and waveform data WD directly from the RAM 30 without intervention of the CPU 20.

2-1-1. Input Buffer:

The input buffer 13 temporarily stores the waveform data WD burst-transferred to the tone generator LSI 10 via the PCI bus interface 12. The input buffer 13 is arranged as a double buffer composed of two buffer areas 131 and 132 so that data can be written into one of the buffer areas 131 or 132 while data are read out from the other buffer area 132 or 131; the input buffer 13 may of course be other than the double buffer, such as a FIFO (First-In-First-Out) or ring buffer. Here, on the basis of the tone color information of the control data CD, the control section 11 specifies a type of the waveform data corresponding to the tone color. Namely, if the tone color information of the control data CD is indicative of a violin tone color, the control section 11 specifies the waveform data WD of the violin tone color.

2-1-2. Arithmetic processing Section:

In accordance with the microprograms MP, the arithmetic processing section 14 performs various arithmetic processing for the individual channels on a time divisional basis. To this end, the arithmetic processing section 14 includes left-channel and right-channel buffers 141 and 142, and first to third effect buffers 143 to 145. In this case, the left-channel and right-channel buffers 141 and 142 are used for reproduction of stereophonic tone data. The first to third effect buffers 143 to 145 are used to carry out an effect process EF that is part of later described post processing POST. Whereas the three effect buffers are provided to allow the effect process EF to impart three kinds of effects, i.e., reverberation, chorus and variation, in the illustrated example, four or more effect buffers may be provided if it is desired that the effect process EF should impart four or more effects.

Figure 2:
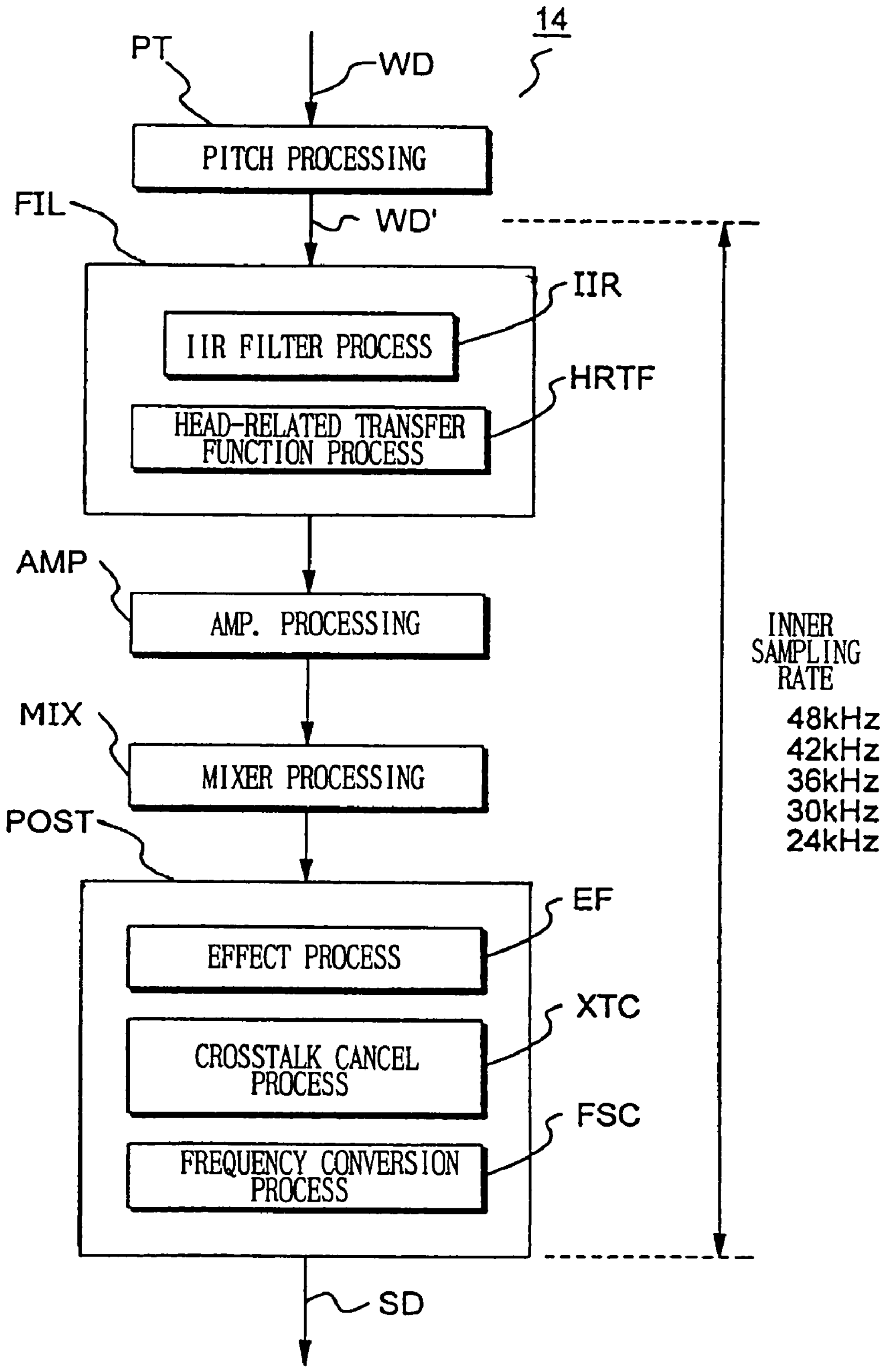
FIG. 2 is a functional block diagram showing various processing, performed by an arithmetic processing section.
Figure 3:
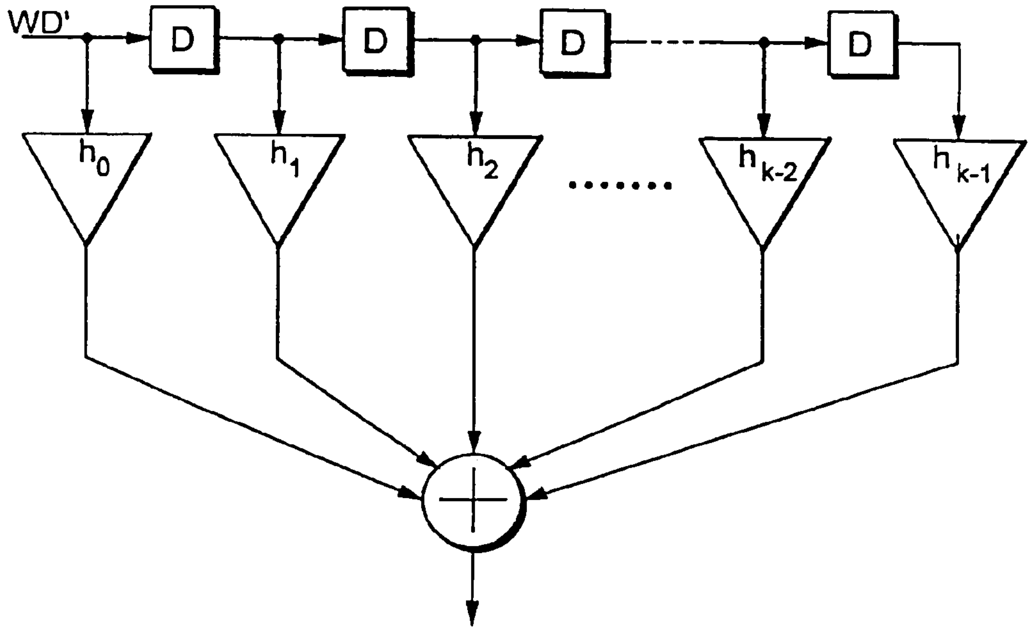
FIG. 3 is a block diagram of an FIR filter equivalent to a head-related transfer function process performed in the preferred embodiment.
Figure 5:
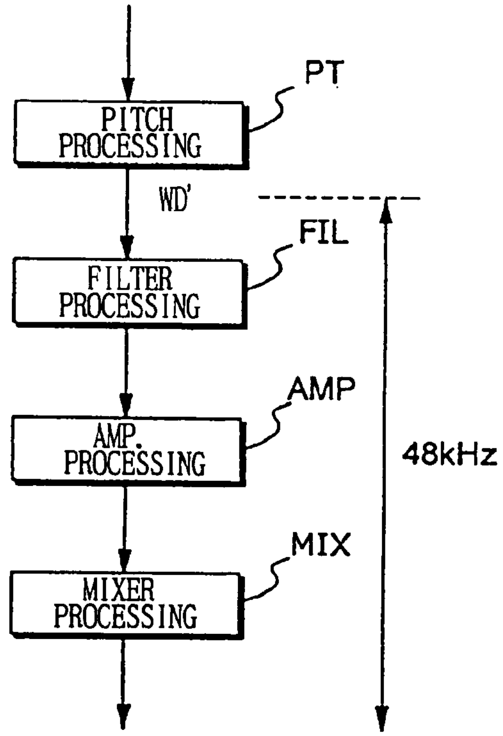
( PRIOR ART ) F I G. 5
FIG. 5 is a functional block diagram showing principal components in a typical example of a conventional tone generator LSI.

Among arithmetic processing performed by the arithmetic processing section 14 are pitch processing PT, filter processing FIL, amplification processing AMP, mixer processing MIX and post processing POST. FIG. 2 is a functional block diagram showing the various processing, performed by the arithmetic processing section 14, as functional modules.

2-1-2-1. Pitch Processing:

The pitch processing PT performs pitch conversion on the waveform data WD, on the basis of the sampling rate information and pitch information of the control data CD, to convert the sampling rate of the waveform data WD to an inner sampling rate selected from among a plurality pf predetermined inner sampling rates. In this case, the predetermined inner sampling rates are, for example, 48 kHz, 42 kHz, 36 kHz, 30 kHz and 24 kHz, although any other rates are possible. In this example, a comparison is made between the sample rate of the waveform data and the predetermined inner sampling rates, so as to select one of the predetermined inner sampling rates which is higher than and closest to the sampling rate of the waveform sample data.

More specifically, if the sample rate of the waveform data designated by the sampling rate information is given as "Fs", selection of one of the predetermined inner sampling rates is made as follows:

(1) When Fs≦24 kHz, the 24 kHz inner sampling rate is selected;

(2) When 24 kHz<Fs<30 kHz, the 30 kHz inner sampling rate is selected;

(3) When 30 kHz<Fs≦36 kHz, the 36 kHz inner sampling rate is selected;

(4) When 36 kHz<Fs≦42 kHz, the 42 kHz inner sampling rate is selected; and (5) When 42 kHz<Fs≦48 kHz, the 48 kHz inner sampling rate is selected.

The reason why the inner sampling rate higher than the sampling rate information is selected is as follows. If one of the inner sampling rates lower than the sampling rate information is selected, the original information contained in the waveform data WD would be lost due to thinning-out of the waveform data WD during the pitch conversion, which would result in a deteriorated quality of the reproductive tone data SD. However, selecting the inner sampling rate higher than the sampling rate information as in the described embodiment can effectively avoid such inconveniences by allowing all the original information in the waveform data WD to be appropriately conveyed to and reflected in the pitch-converted waveform data WD'.

Further, the reason for selecting the inner sampling rate closest to the sampling rate information is as follows. Considering the quality of the reproductive tone data SD, it is necessary to set the inner sampling rate higher than the sampling rate information, as noted above; however, raising the sampling rate would increase a total number of samples to be processed per subframe period, thereby increasing the processing loads of the tone generator LSI 10. To avoid such an increase in processing loads of the tone generator LSI 10, there arises a need to convert the sampling rate of the waveform data WD to as low an inner sampling rate as possible. Thus, the described embodiment is arranged to select ones of the inner sampling rates which is closest to the sampling rate information.

By selecting one of the predetermined inner sampling rates which is higher than and closest to the sampling rate of the waveform sample data as stated above, the processing loads of the tone generator LSI 10 can be effectively lessened without degrading the quality of the reproductive tone data SD.

2-1-2-2. Filter Processing:

The filter processing FIL includes a second-order IIR filter process IIR, and a head-related transfer function process HRTF for calculating a head-related transfer function to execute 3-D sound positioning. In this embodiment, the IIR filter process IIR is directed to imparting a delicate tone-color modulation effect, e.g., in a situation where the tone generator LSI is applied as a sound synthesizer, by causing filter coefficient data to dynamically vary over time.

According to the 3D sound positioning process, a head-related transfer function HRTF indicative of a sound wave transfer from a virtual sound source to the left and right ears is measured in advance in association with coordinates of a virtual sound source, and a coefficient of the head-related transfer function HRTF (i.e., "HRTF" coefficient) is varied dynamically as the coordinates of the sound source change. Thus, the filter processing FIL reads out coefficient data from the internal memory having prestored therein various coefficient data necessary for the IIR filter process IIR and the head-related transfer function process HRTF, and then carries out arithmetic processing based on the read-out coefficient data. If this filter processing FIL is performed directly on the waveform data WD without being subjected to the above-mentioned pitch processing PT, a great number of sets of the coefficient data, corresponding to possible sampling rates the input waveform data WD, would have to be prestored in the internal memory and therefore the internal memory must have a large storage capacity. However, because every waveform data WD is converted to any one of the five inner sampling rates in this embodiment, it is only necessary to provide five sets of the coefficient data corresponding to the inner sampling rates.

2-1-2-3. Amplification Processing:

After the filter processing FIL, the amplification processing AMP is executed on the basis of the tone volume information of the control data CD; that is, the amplification processing AMP multiplies the waveform data WD', having undergone the filter processing FIL, by a coefficient corresponding to the tone volume information of the control data CD, to thereby generate volume-adjusted waveform data WD'.

2-1-2-4. Mixer Processing:

Following the amplification processing AMP, the mixer processing MIX distributively stores the generated tone data of the individual channels into corresponding ones of the left-channel and right-channel buffers 141 and 142 and first to third effect buffers 143–145. When the mixer processing MIX stores each of the tone data into the corresponding buffer, the mixer processing MIX first reads out the tone data already stored in the buffer and then adding the read-out tone data to the newly-generated tone data, so as to store the resultant added data into the buffer.

Now, let's assume a case where a chorus effect is to be imparted to the tone data of channel ch1 to channel ch5 and the first effect buffer 143 is used for this chorus effect impartment and that the internal processing is conducted in accordance with the inner sampling rate of 36 kHz (i.e., 48 samples per subframe). In this case, 48 samples for channel ch1 are first generated and stored into the first effect buffer 143. Then, 48 samples for channel ch2 are sequentially generated, in synchronism with which 48 samples for channel ch2 are sequentially read out from the first effect buffer 143 for addition between corresponding ones of the samples for channel ch1 and channel ch2. The resultant added samples are stored back into the first effect buffer 143. By repeating these operations up to channel ch5, the tone data of channel ch1 to channel ch5 are sequentially accumulated.

Note that, in the present embodiment, the tone data accumulation by the mixer processing MIX is carried out only between the channels of the same inner same sampling rate, not between different inner same sampling rates. Synthesis between the tone data of different inner same sampling rates is performed when writing the tone data into the output buffer after a frequency conversion process FSC in the post processing POST.

2-1-2-5. Post Processing:

In the post processing POST, there are carried out a crosstalk cancel process XTC, the effect process EF and the frequency conversion process FSC.

The crosstalk cancel process XTC is part of the above-mentioned 3-D sound positioning process and is paired with the head-related transfer function process HRTF described above in relation to the filter processing FIL. Waveform data generated by the head-related transfer function process HRTF presupposes that a sound is input directly to the left and right ears. Thus, no problems would be encountered in a situation where sound generation means are located in close proximity to the left and right ears of a human listener so that a sound from one of the sound generation means is heard only by one of the ears as is usually the case with headphones; however, where left-channel and right-channel speakers are placed in front of the human listener, a sound from one of the speakers would reach the two ears, thereby causing a problem commonly known as "crosstalk". Therefore, the crosstalk cancel process XTC is directed to modifying the tone data stored in the left-channel and right-channel buffers 141 and 142 so as to avoid such crosstalk auditorily perceived by the listener.

The effect process EF is directed to imparting sound effects, such as reverberation, chorus and variation, which is carried out on the basis of the tone data stored in the first to third effect buffers 143 to 145 that are provided for the effect process. In the reverberation imparting process, there are performed all-pass filter and comb filter operations using relatively long time delays. In this case, the costs of the tone generator LS 10 can be reduced further by transferring the tone data from the effect buffers to the RAM 30 for temporary storage therein and then getting the tone data back from the RAM 30 after a predetermined time delay.

As previously mentioned, the inner sampling rate in the described embodiment is selected from among the 48 kHz, 42 kHz, 36 kHz, 30 kHz and 24 kHz by the pitch processing PT. The tone data accumulation by the mixer processing MIX, on the other hand, is performed on the tone data of a given inner sampling rate. For this reason, in order to perform synthesis between the tone data of different inner sampling rates, it is necessary to adjust the different inner sampling rates to match with each other. The frequency conversion process FSC is directed to this purpose, where the tone data generated at various inner sampling rates are converted to tone data of a same sampling rate to allow the synthesis between the tone data. If these inner sampling rates are converted to a sampling rate different from the output sampling, there will arise a need to again convert the sampling rate to the output sampling rate; thus, in this embodiment, the various inner sampling rates are all converted to the output sampling rate of 48 kHz. However, the frequency conversion process FSC is not executed in the event the inner sampling rate coincides with the output sampling rate.

2-1-3. Output Buffer:

The output buffer 15 is also a double buffer which is composed of first left-channel and right-channel buffer areas 151 and 152, and second left-channel and right-channel buffer areas 153 and 154. While some reproductive tone data SD are being written into the first left-channel and right-channel buffer areas 151 and 152, other reproductive tone data SD are output from the second left-channel and right-channel buffer areas 153 and 154. Conversely, while some reproductive tone data SD are being written into the second left-channel and right-channel buffer areas 153 and 154, other reproductive tone data SD are output from the first left-channel and right-channel buffer areas 151 and 152. Similarly to the input buffer 13, this output buffer 15 may of course be other than the double buffer, such as a FIFO (First-In-First-Out) or ring buffer. In writing the tone data into one of the buffer areas of the output buffer 15, the tone data already stored in that buffer area are read out therefrom and added to the newly generated tone data, so that the thus-added or accumulated tone data are then written back into the buffer area.

Because the inner sampling rate of the tone data read out from the inner buffer has been converted by the above-described frequency conversion process FSC to the output sampling rate, the reproductive tone data SD having been converted to the output sampling rate are stored into the output buffer 15. Then, as the reproductive tone data SD are read out from the output buffer 15 in accordance with the output sampling frequency (48 kHz), these tone data SD are each converted from digital representation to analog representation so as to be supplied to the outside as a reproduced tone signal S.

3. Exemplary Behavior of Embodiment:

Now, with reference to the drawings, a description will be about exemplary behavior when the computer system A in accordance with the preferred embodiment generates the reproductive tone data SD.

Figure 4:
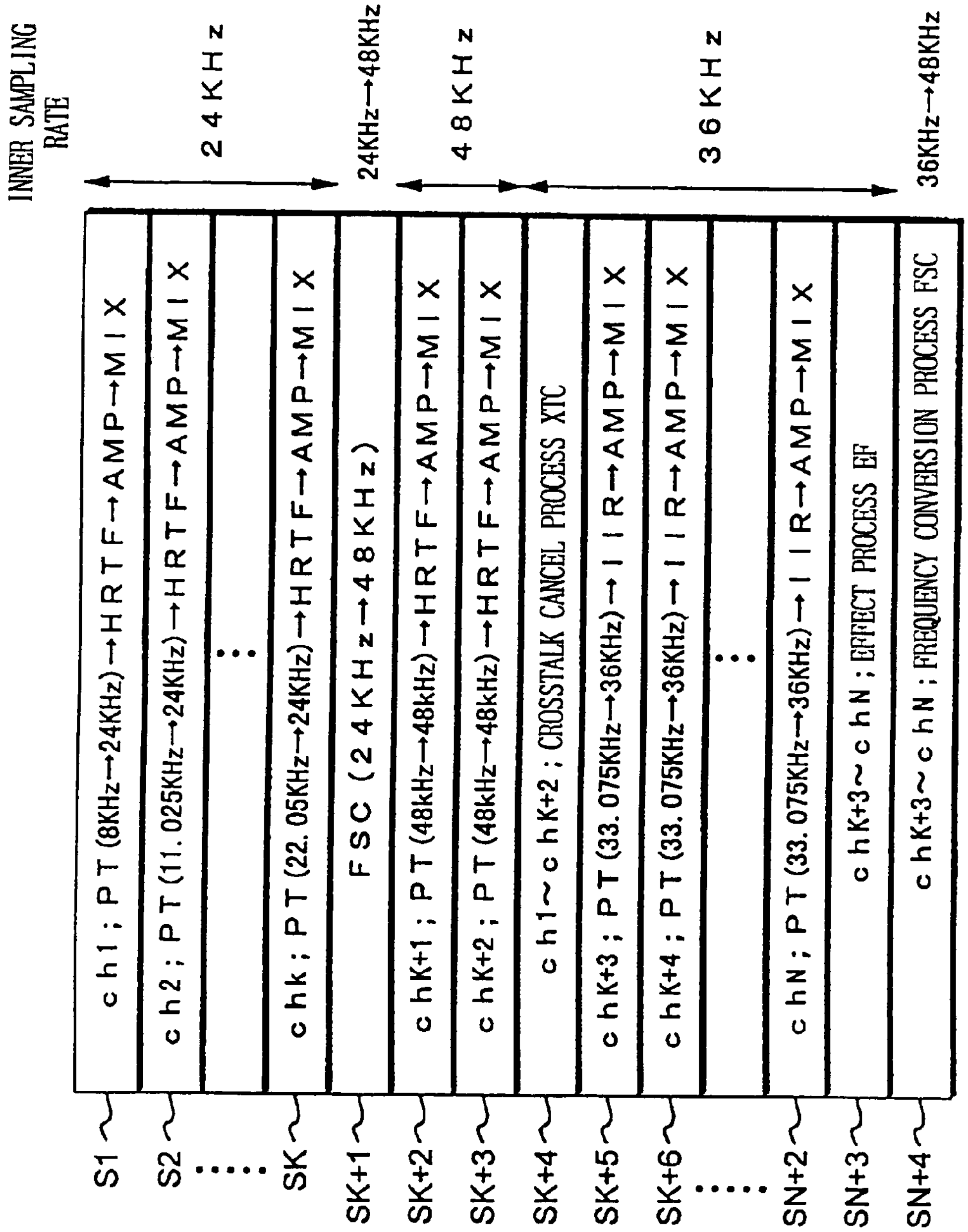
FIG. 4 is a flow chart showing exemplary operation of a tone generator LSI employed in the preferred embodiment.

FIG. 4 is a flow chart showing exemplary operation of the tone generator LSI 10. In this case, let it be assumed that channels ch1–chK+2 are used for the 3-D sound positioning and channels chK+3–chN are used for reproduction of the waveform data.

First, wen the device driver DD passes control data CD to the control section 11 of the tone generator LSI 10 in response to a sound generation instruction from a higher-order application, data to be transferred are specified on the basis of the tone color information of the control data CD. Once the control section 11 designates the data to be transferred to the PCI bus interface 12, the PCI bus interface 12 functions as the bus master to read out the designated data from the RAM 30 and burst-transfers the read-out data to the input buffer 13.

Let's also assume that channels ch1–chK process waveform data WD1–WDK sampled at a sampling rate lower than 24 kHz, channels chK+1 and chK+2 process waveform data WDK+1 and WDK+2 sampled at 48 kHz, and channels chK+3–chN process waveform data WDK+3–WDN at 33.075 kHz.

At steps S1 to SK, the waveform data WD1–WDK sampled at the sampling rate lower than 24 kHz are subjected to pitch conversion by the pitch processing PT. As shown, channels ch1, ch2 and chK have sampling rates of 8 kHz, 11.025 kHz and 22.05 kHz, respectively, and the sampling rates of these channels are adjusted by the pitch processing PT to a same inner sampling rate of 24 kHz.

After that, the head-related transfer function process HRTF, amplification processing AMP and mixer processing MIX are carried out. In the mixer processing MIX, the accumulation of the tone data is effected using the left-channel and right-channel buffers 141 and 142. If the tone data of the individual channels having been subjected to the amplification processing AMP are represented by SD1–SDN, the mixer processing MIX of step SK adds the tone data SD1+SD2+, . . . , SDK−1, having been accumulated up to step SK−1, to the tone data SDK. Such tone data accumulation is possible because the sampling rates of the tone data have been adjusted to the same inner sampling rate of 24 kHz via the pitch processing PT. Once the processing at the 24 kHz inner sampling rate has been completed, the frequency conversion process FSC is executed, where the sampling rate of the tone data stored in the left-channel and right-channel buffers 141 and 142 is converted to the output sampling rate and the thus-converted tone data are transferred into the output buffer 15 (step SK+1).

At following steps SK+2 and SK+3, channels chK+1 and chK+2 are processed, which handles the waveform data WDK+1 and WD+2 sampled at 48 kHZ. For this reason, the frequency conversion process FSC is omitted here, so that these steps only executes the pitch processing PT and head-related transfer function process HRTF as necessitated by a pitch shift and the amplification processing AMP and mixer processing MIX. In this case, the internal processing is carried out in accordance with the output sampling rate, and thus the mixer processing MIX executes accumulation between the waveform data WDK+1 and WD+2 and the tone data stored in the output buffer 15. Assuming that the arithmetic processing section 14 accesses the first left-channel and right-channel buffer areas 151 and 152 of the output buffer 15, the crosstalk cancel process XTC performed at step SK+4 is carried out on the basis of the tone data stored in the first left-channel and right-channel buffer areas 151 and 152 and then the processed results are again stored into these buffer areas 151 and 152.

Upon completion of the 3-D sound positioning process, the operational flow proceeds to step SK+5. At steps SK+5–SN+4, operations are performed for channels chK+3–chN. Because these channels chK+3–chN process the waveform data WDK+3–WDN sampled at 33.075 kHz, the pitch processing PT sets the 36 kHz sampling rate. After that the IIR filter process IIR, amplification processing AMP and mixer processing MIX are executed, followed by the effect process EF (step SN+3).

When the tone data of channels chK+3–chN have been synthesized to thereby generate 48 samples per subframe, the the frequency conversion process FSC is carried out at step SN+4 in order to add these generated data into the output buffer 15. In the frequency conversion process FSC, the 48 samples of data obtained in accordance with the inner sampling rate are converted into 64 samples. In this way, the sampling rate of the generated reproductive tone data SD can be made coincident with that of the data stored in the output buffer 16. By thus adding the generated samples into the output buffer 15, synthesis can be made between the reproductive tone data SD of different inner sampling rates.

As a result, the reproductive tone data SD, having undergone the 3-D positioning process (24 kHz and 48 kHz inner sampling rates) and the effect process (36 kHz inner sampling rate), can be generated within the output buffer 15.

According to the above-described exemplary behavior, the operations of the individual channels are performed at a plurality of different inner sampling rates, such as 24 kHz at steps S1–SK, 48 kHz at steps SK+2 and SK+3 and 36 kHz at steps SK+5–SN+3. However, because the frequency conversion process FSC is performed except when the inner sampling rate coincides with the output sampling frequency (step SK+2 and SK+3), the embodiment is allowed to accumulate the tone data processed at different inner sampling rates. Further, because the order in which the individual channels are processed is set in such a manner that those steps using a same inner sampling occur successively, the number of the frequency conversion process FSC can minimized.

4. Advantageous Results of Embodiment:

Because an inner sampling rate higher than the sampling information is selected by the pitch processing PT in the above-described embodiment, all the original information in the waveform data WD can be appropriately conveyed to and reflected in the pitch-converted waveform data WD', with the result that high-quality reproductive tone data can be provided by the embodiment.

Further, with the arrangement that an inner sampling rate closest to the sampling rate of the waveform sample data is selected, the described embodiment can minimize the number of samples to be process within a subframe period, to thereby lessen the processing loads of the tone generator LSI 10.

Furthermore, because the inner sampling rate is converted to the output sampling rate through the frequency conversion process FSC, the described embodiment can carry out the internal processing of the tone generator LSI 10 using a plurality of inner sampling rates.

As a result, the described embodiment of the present invention allows the 3-D sound positioning process, effect process etc. to be incorporated in the tone generator LSI 10 with substantially the same size as the conventional tone generator LSIs.

In summary, the present invention arranged in the above-mentioned manner can provide a tone data processing device, method and computer system which can carry out high-level arithmetic processing for generating tone data with minimized the processing loads.

What is claimed is:

1. A tone data processing device capable of collectively receiving, from a storage device storing waveform sample data sampled at a given sampling rate, a given number of the waveform sample data, for a plurality of channels, asynchronously with the given sampling rate, and generating tone data on the basis of the waveform sample data received from said storage device, said tone data processing device being connectable to a central processing unit and said storage device via a bus of the central processing unit, said tone data processing device comprising:

an input buffer for storing the waveform sample data for each of the channels collectively received from said storage device via said bus;

an output buffer; and a processor connected with said input buffer and said output buffer and adapted to execute:

a first process for collectively reading out, for each of the channels, a given number of the waveform sample data stored in said input buffer and converting, for each of the channels, the sampling rate of the read-out waveform sample data to an inner sampling rate selected for each of the channels from among a plurality of predetermined inner sampling rates, wherein said first process compares the sampling rate of the waveform sample data stored in said input buffer and the plurality of predetermined inner sampling rates to thereby select one of the predetermined inner sampling rates which is higher than or equal to and closest to the sampling rate of the waveform sample data, and converts the sampling rate of the waveform sample data to the selected inner sampling rate;

a second process for performing, for each of the channels, predetermined arithmetic processing on the waveform sample data converted to the selected inner sampling rate;

a third process for converting, for each of the channels, the waveform sample data having undergone the predetermined arithmetic processing to a predetermined output sampling rate; and a fourth process for writing, into said output buffer, the waveform sample data converted to the predetermined output sampling rate.

2. A tone data processing device as recited in claim 1 wherein said processor is adapted to further perform a process for sequentially reading out the waveform sample data from said output buffer at an output sampling frequency corresponding to said predetermined output sampling rate to thereby generate tone data in accordance with the output sampling frequency.

3. A tone data processing device as recited in claim 1 wherein said fourth process accumulates the waveform sample data of a given channel with the waveform sample data of another channel already written in said output buffer and thereby renews stored contents of said output buffer with resultant accumulated values of the waveform sample data in such a manner that waveform data obtained by adding together the waveform sample data converted to said predetermined output sampling rate are ultimately stored into said output buffer.

4. A tone data processing device capable of collectively receiving, from a storage device storing waveform sample data sampled at a given sampling rate, a given number of the waveform sample data, for a plurality of channels, asynchronously with the given sampling rate, and generating tone data on the basis of the waveform sample data received from said storage device, said tone data processing device being connectable to a central processing unit and said storage device via a bus of the central processing unit, said tone data processing device comprising:

an input buffer for storing the waveform sample data for each of the channels collectively received from said storage device via said bus;

an output buffer; and a processor connected with said input buffer and said output buffer and adapted to execute:

a first process for collectively reading out, for each of the channels, a given number of the waveform sample data stored in said input buffer and converting, for each of the channels, the sampling rate of the read-out waveform sample data to an inner sampling rate selected for each of the channels from among a plurality of predetermined inner sampling rates:

a second process for performing, for each of the channels, predetermined arithmetic processing on the waveform sample data converted to the selected inner sampling rate;

a third process for converting, for each of the channels, the waveform sample data having undergone the predetermined arithmetic processing to a predetermined output sampling rate; and a fourth process for writing, into said output buffer, the waveform sample data converted to the predetermined output sampling rate, wherein the waveform sample data of individual channels transferred from said storage device to said input buffer can be of different sampling rates, wherein said first process performed by said processor is capable of converting the waveform sample data to different inner sampling rates depending on respective channels of the waveform sample data, and wherein when it is possible to perform predetermined arithmetic processing of same contents on the waveform sample data of different channels having been converted to a same inner sampling rate, said second process adds together corresponding ones of the waveform sample data of the different channels and performs the predetermined arithmetic processing on the added waveform sample data.

5. A tone data processing device as recited in claim 1 wherein said storage device is managed via said central processing unit.

6. A tone data processing device capable of collectively receiving, from a storage device storing waveform sample data sampled at a given sampling rate, a given number of the waveform sample data, for a plurality of channels, asynchronously with the given sampling rate, and generating tone data on the basis of the waveform sample data received from said storage device, said tone data processing device being connectable to a central processing unit and said storage device via a bus of the central processing unit, said tone data processing device comprising:

an input buffer for storing the waveform sample data for each of the channels collectively received from said storage device via said bus;

an output buffer; and a processor connected with said input buffer and said output buffer and adapted to execute:

a first process for collectively reading out, for each of the channels, a given number of the waveform sample data stored in said input buffer and converting, for each of the channels, the sampling rate of the read-out waveform sample data to an inner sampling rate selected for each of the channels from among a plurality of predetermined inner sampling rates;

a second process for performing, for each of the channels, predetermined arithmetic processing on the waveform sample data converted to the selected inner sampling rate;

a third process for converting, for each of the channels, the waveform sample data having undergone the predetermined arithmetic processing to a predetermined output sampling rate; and a fourth process for writing, into said output buffer, the waveform sample data converted to the predetermined output sampling rate, wherein the predetermined arithmetic processing performed by said processor includes a filter process, and a resolution of a set of coefficients to be used in said filter process is changed in accordance with the selected inner sampling rate.

7. A tone data processing device as recited in claim 1 wherein the predetermined arithmetic processing performed by said processor includes at least one of a filter process, amplification process, mixing process and effect imparting process.

8. A tone data processing device as recited in claim 1 wherein when converting the sampling rate of the waveform sample data to the inner sampling rate, said first process performed by said processor also performs an operation for setting a pitch of a tone based on the waveform sample data in accordance with tone pitch control information.

9. A computer system comprising:

a central processing unit;

a storage device storing waveform sample data sampled at a given sampling rate and connected via a bus to said central processing unit; and a tone data processing device connected via said bus to said central processing unit and said storage device, said tone data processing device collectively receiving, from said storage device, a given number of the waveform sample data, for a plurality of channels, asynchronously with the given sampling rate, said tone data processing device under control of said central processing unit and generating tone data on the basis of the waveform sample data collectively received from said storage device, said tone data processing device comprising:

an input buffer for storing the waveform sample data for each of the channels collectively received from said storage device via said bus;

an output buffer; and a processor connected with said input buffer and said output buffer and adapted to perform, a first process for collectively reading out, for each of the channels, a given number of the waveform sample data stored in said input buffer and converting, for each of the channels, the sampling rate of the read-out waveform sample data to an inner sampling rate selected for each of the channels from among a plurality of predetermined inner sampling rates, wherein said first process compares the sampling rate of the waveform sample data stored in said input buffer and the plurality of predetermined inner sampling rates to thereby select one of the predetermined inner sampling rates which is higher than or equal to and closest to the sampling rate of the waveform sample data, and converts the sampling rate of the waveform sample data to the selected inner sampling rate;

a second process for performing, for each of the channels, predetermined arithmetic processing on the waveform sample data converted to the selected inner sampling rate;

a third process for converting, for each of the channels, the waveform sample data having undergone the predetermined arithmetic processing to a predetermined output sampling rate; and a fourth process for writing, into said output buffer, the waveform sample data converted to the predetermined output sampling rate.

10. A computer system as recited in claim 9 wherein said processor is adapted to further perform a process for sequentially reading out the waveform sample data from said output buffer at an output sampling frequency corresponding to said predetermined output sampling rate to thereby generate tone data by means of said tone data processing device in accordance with the output sampling frequency.

11. A computer-readable medium containing a group of executable instructions for causing a processor to perform a method of tone data processing, said method comprising the steps of: collectively receiving, from a storage device storing waveform sample data sampled at a given sampling rate, a given number of the waveform sample data, for a plurality of channels, asynchronously with the given sampling rate; generating tone data on the basis of the waveform sample data received from said storage device; storing the waveform sample data for each of the channels collectively received from said storage device to an input buffer being connected to said processor;

collectively reading out, for each of the channels, a given number of the waveform sample data stored in said input buffer and converting, for each of the channels, the sampling rate of the read-out waveform sample data to an inner sampling rate selected for each of the channels from among a plurality of predetermined inner sampling rates, wherein said first step includes comparing the sampling rate of the waveform sample data stored in said input buffer and the plurality of predetermined inner sampling rates to thereby select one of the predetermined inner sampling rates which is higher than or equal to and closest to the sampling rate of the waveform sample data, and converting the sampling rate of the waveform sample data to the selected inner sampling rate;

performing, for each of the channels, predetermined arithmetic processing on the waveform sample data converted to the selected inner sampling rate;

converting, for each of the channels, the waveform sample data having undergone the predetermined arithmetic processing to a predetermined output sampling rate; and writing, into an output buffer that is connected to said processor, the waveform sample data converted to the predetermined output sampling rate.

12. A machine-readable medium as recited in claim 11 wherein said program further comprises a step of sequentially reading out the waveform sample data from said output buffer at an output sampling frequency corresponding to said predetermined output sampling rate to thereby generate tone data in accordance with the output sampling frequency.

13. A tone data processing device for receiving waveform sample data sampled at a given sampling rate and generating tone data on the basis of the received waveform sample data, said tone data processing device being connectable to a bus of a computer, said tone data processing device comprising:

a receiving section that collectively receives, via said bus, under control of said computer, for each of a plurality of channels, a given number of the waveform sample data asynchronously with the given sampling rate;

a first sampling rate conversion section that converts, for each of the channels, the sampling rate of the received waveform sample data to an inner sampling rate selected for each of the channels from among a plurality of predetermined inner sampling rates, wherein said first sampling rate conversion section compares the given sampling rate of the received waveform sample data and the plurality of predetermined inner sampling rates to thereby select one of the predetermined inner sampling rates which is higher than or equal to and closest to the sampling rate of the waveform sample data, and converts the sampling rate of the waveform sample data to the selected inner sampling rate;

an arithmetic processing section that performs, for each of the channels, predetermined arithmetic processing on the waveform sample data converted to the selected inner sampling rate;

a second sampling rate conversion section that converts, for each of the channels, the waveform sample data having undergone the predetermined arithmetic processing to a predetermined output sampling rate; and an output section that adds the waveform sample data of the plural channels converted to the predetermined output sampling rate and outputs the added waveform sample data in accordance with the predetermined output sampling rate.

14. A tone data processing method of receiving waveform sample data sampled at a given sampling rate and generating tone data on the basis of the received waveform sample data, said waveform sample data being supplied via a bus on a computer, said tone data processing method comprising:

a step of collectively receiving, via said bus, under control of said computer, for each of a plurality of channels, a given number of the waveform sample data asynchronously with the given sampling rate;

a step of converting, for each of the channels, the sampling rate of the received waveform sample data to an inner sampling rate selected for each of the channels from among a plurality of predetermined inner sampling rates, wherein said converting step includes comparing the given sampling rate of the received waveform sample data and the plurality of predetermined inner sampling rates to thereby select one of the predetermined inner sampling rates which is higher than or equal to and closest to the sampling rate of the waveform sample data, and converting the sampling rate of the waveform sample data to the selected inner sampling rate;

a step of performing, for each of the channels, predetermined arithmetic processing on the waveform sample data converted to the selected inner sampling rate;

a step of converting, for each of the channels, the waveform sample data having undergone the predetermined arithmetic processing to a predetermined output sampling rate; and a step of adding the waveform sample data of the plural channels converted to the predetermined output sampling rate and outputting the added waveform sample data in accordance with the predetermined output sampling rate.

15. A computer system as recited in claim 9 wherein said fourth process accumulates the waveform sample data of a given channel with the waveform sample data of another channel already written in said output buffer and thereby renews stored contents of said output buffer with resultant accumulated values of the waveform sample data in such a manner that waveform data obtained by adding together the waveform sample data converted to said predetermined output sampling rate are ultimately stored in said output buffer.

16. A machine-readable medium as recited in claim 11 wherein said fourth step accumulates the waveform sample data of a given channel with the waveform sample data of another channel already written in said output buffer and thereby renews stored contents of said output buffer with resultant accumulated values of the waveform sample data in such a manner that waveform data obtained by, adding together the waveform sample data converted to said predetermined output sampling rate are ultimately stored into said output buffer.

17. A tone data processing method of collectively receiving, from a storage device storing waveform sample data sampled at a given sampling rate, a given number of the waveform sample data for a plurality of channels asynchronously with the given sampling rate and generating tone data on the basis of the waveform sample data received from said storage device, said waveform sample data being supplied via a bus, said method comprising:

collectively reading out, for each of the channels, a given number of the waveform sample data stored in an input buffer and first converting, for each of the channels, the sampling rate of the read-out waveform sample data to an inner sampling rate selected for each of the channels from among a plurality of predetermined inner sampling rates;

performing, for each of the channels, predetermined arithmetic processing on the waveform sample data converted to the selected inner sampling rate;

second converting, for each of the channels, the waveform sample data having undergone the predetermined arithmetic processing to a predetermined output sampling rate; and writing, into an output buffer, the waveform sample data converted to the predetermined output sampling rate, wherein the waveform sample data of individual channels transferred from said storage device to said input buffer can be of different sampling rates, such that said first step of converting comprises converting the waveform sample data to different inner sampling rates depending on respective channels of the waveform sample data, and wherein when it is possible to perform predetermined arithmetic processing of same contents on the waveform sample data of different channels having been converted to a same inner sampling rate, said step of performing comprises adding together corresponding ones of the waveform sample data of the different channels and performing the predetermined arithmetic processing on the added waveform sample data.

18. A tone data processing method of collectively receiving, from a storage device storing waveform sample data sampled at a given sampling rate, a given number of the waveform sample data for a plurality of channels asynchronously with the given sampling rate and generating tone data on the basis of the waveform sample data received from said storage device, said waveform sample data being supplied via a bus, said method comprising:

collectively reading out, for each of the channels, a given number of the waveform sample data stored in an input buffer and converting, for each of the channels, the sampling rate of the read-out waveform sample data to an inner sampling rate selected for each of the channels from among a plurality of predetermined inner sampling rates;

performing, for each of the channels, predetermined arithmetic processing on the waveform sample data converted to the selected inner sampling rate;

converting, for each of the channels, the waveform sample data having undergone the predetermined arithmetic processing to a predetermined output sampling rate; and writing, into an output buffer, the waveform sample data converted to the predetermined output sampling rate, wherein said step of performing the predetermined arithmetic processing comprises a filter process, and changing a resolution of a set of coefficients to be used in said filter process in accordance with the selected inner sampling rate.

* * * * *